US011573928B2

(12) United States Patent
Kucherov et al.

(10) Patent No.: US 11,573,928 B2
(45) Date of Patent: Feb. 7, 2023

(54) TECHNIQUES FOR DATA DEDUPLICATION

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 258 days.

(21) Appl. No.: 16/818,098

(22) Filed: Mar. 13, 2020

(65) Prior Publication Data

US 2021/0286768 A1 Sep. 16, 2021

(51) Int. Cl.
*G06F 16/00* (2019.01)
*G06F 16/174* (2019.01)
*G06F 16/13* (2019.01)
*G06F 12/0811* (2016.01)
*G06F 16/22* (2019.01)
*G06F 11/07* (2006.01)
*G06F 16/182* (2019.01)

(52) U.S. Cl.
CPC ........ *G06F 16/1748* (2019.01); *G06F 11/076* (2013.01); *G06F 12/0811* (2013.01); *G06F 16/137* (2019.01); *G06F 16/1824* (2019.01); *G06F 16/2282* (2019.01)

(58) Field of Classification Search
CPC .............. G06F 16/1748; G06F 11/076; G06F 12/0811; G06F 16/137; G06F 16/1824; G06F 16/2282
See application file for complete search history.

(56) References Cited

U.S. PATENT DOCUMENTS

| 2013/0268497 A1* | 10/2013 | Baldwin | ............... G06F 3/0641 |
| | | | 707/692 |
| 2015/0019500 A1* | 1/2015 | Aronovich | .......... G06F 16/1748 |
| | | | 707/692 |
| 2018/0074745 A1* | 3/2018 | Harnik | .................. G06F 3/0641 |
| 2021/0240349 A1* | 8/2021 | Meiri | .................. G06F 21/6218 |

\* cited by examiner

*Primary Examiner* — Tyler J Torgrimson
(74) *Attorney, Agent, or Firm* — Muirhead and Saturnelli, LLC

(57) ABSTRACT

Techniques for processing data may include: receiving a data block stored in a data set, wherein a hash value is derived from the data block; determining, in accordance with selection criteria, whether the hash value is included in a subset; responsive to determining the hash value is included in the subset, performing processing that updates a table in accordance with the hash value and the data set, and determining, in accordance with the information in the table, whether to perform deduplication processing for the data block to determine whether the data block is a duplicate of another stored data block. The table may include an entry for the hash value. The entry may include information identifying data sets referencing the data block and, for each of the data sets, may specify a reference count denoting a number of times the data set references the data block.

13 Claims, 9 Drawing Sheets

| 302 Block Hash | 304 Location |
|---|---|
| D1 | L1 |
| D5 | L5 |
| D8 | L8 |
| D99 | L9 |
| .. | |

Deduplication (Dedup) Data Store 312

FIG. 3

TECHNIQUES FOR DATA DEDUPLICATION

BACKGROUND

Technical Field

This application generally relates to data storage and, more particularly, data deduplication techniques.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing data comprising: receiving a first data block stored at a first logical address in a first data set, wherein a first hash value is derived from the first data block; determining, in accordance with one or more selection criteria, whether the first hash value is included in a subset of hash values; responsive to determining the first hash value is included in the subset, performing first processing that updates a table in accordance with the first hash value and the first data set, wherein the table includes information about hash values in the subset, and wherein the table includes a first entry for the first hash value and includes first information, wherein the first information identifies one or more data sets that reference the first data block and, for each of the one or more data sets of the first information, specifies a reference count denoting a number of times the first data block is referenced by said each data set; and determining, in accordance with the information in the table, whether to perform deduplication processing for the first data block to determine whether the first data block is a duplicate of another stored data block. Determining whether to perform deduplication processing for the first data block further may include: determining a first data deduplication rate for the first data set; determining whether the first data deduplication rate is greater than a threshold rate; and responsive to determining the first data deduplication is greater than the threshold rate, performing deduplication processing for the first data block to determine whether the first data block is a duplicate of another stored data block. A deduplication data store may include a first entry for the first hash value and the first data block.

In at least one embodiment, processing may include determining, in accordance with the information in the table, whether to store the first entry in a cached portion of the deduplication data store; and determining, in accordance with the information in the table, whether to store the first entry in one of a plurality of a cached portions of the deduplication data store, wherein each of the plurality of cached portions is stored in a different one of a plurality of caching levels. Processing may also include, responsive to determining the first data deduplication is not greater than the threshold rate, determining not to perform performing deduplication processing for the first data block to determine whether the first data block is a duplicate of another stored data block.

In at least one embodiment, each data set may be a logically defined storage entity. The logically defined storage entity may include any one or more of: one or more logical devices, a portion of a logical device, a plurality of portions of a plurality of logical devices, one or more files, one or more file systems, and one or more directories.

In at least one embodiment, the first processing may further update the table in accordance with the first logical address at which the first data block is stored in the first data set. The table may include a second entry for a second hash value and second information, wherein the second hash value may be derived from a second data block, and wherein the second information may identify one or more data sets that reference the second data block and, for each of the one or more data sets of the second information, may specify a reference count denoting a number of times the second data block is referenced by said each data set of the second information. The second data block may be stored at a second logical address in a second data set and also stored at a third logical address of a third data set, wherein the second information may further include the second logical address and denote that the second logical address of the second data set references the second data block from which the second hash value is derived. The second information may further include the third logical address and denote that third logical address of the third data set references the second data block from the second hash value is derived. The first data block may be stored at a fourth logical address of a fourth data set, wherein the first information may further include the fourth logical address and denote that the fourth logical address of the fourth data set references the first data block from which the first hash value is derived. Processing may include: determining a first distance between the first logical address and the fourth logical address of the first entry; determining a second distance between the second logical address and the third logical address of the second entry; determining whether the first distance equals the second distance; and responsive to determining the first distance equals the second distance, performing deduplication processing to locate duplicate data blocks in the first data set and the second data set. Processing may be performed inline as part of an I/O or data path. Processing may be performed offline not as part of the I/O or data path.

BRIEF DESCRIPTION OF THE DRAWINGS

Features and advantages of the present invention will become more apparent from the following detailed description of exemplary embodiments thereof taken in conjunction with the accompanying drawings in which:

FIG. 2B is an example illustrating the I/O path or data path in connection with processing data in an embodiment in accordance with the techniques herein.

FIG. 3 is an example of a deduplication data store structure that may be used in an embodiment in accordance with the techniques herein.

DETAILED DESCRIPTION OF EMBODIMENT(S)

Figure 1:
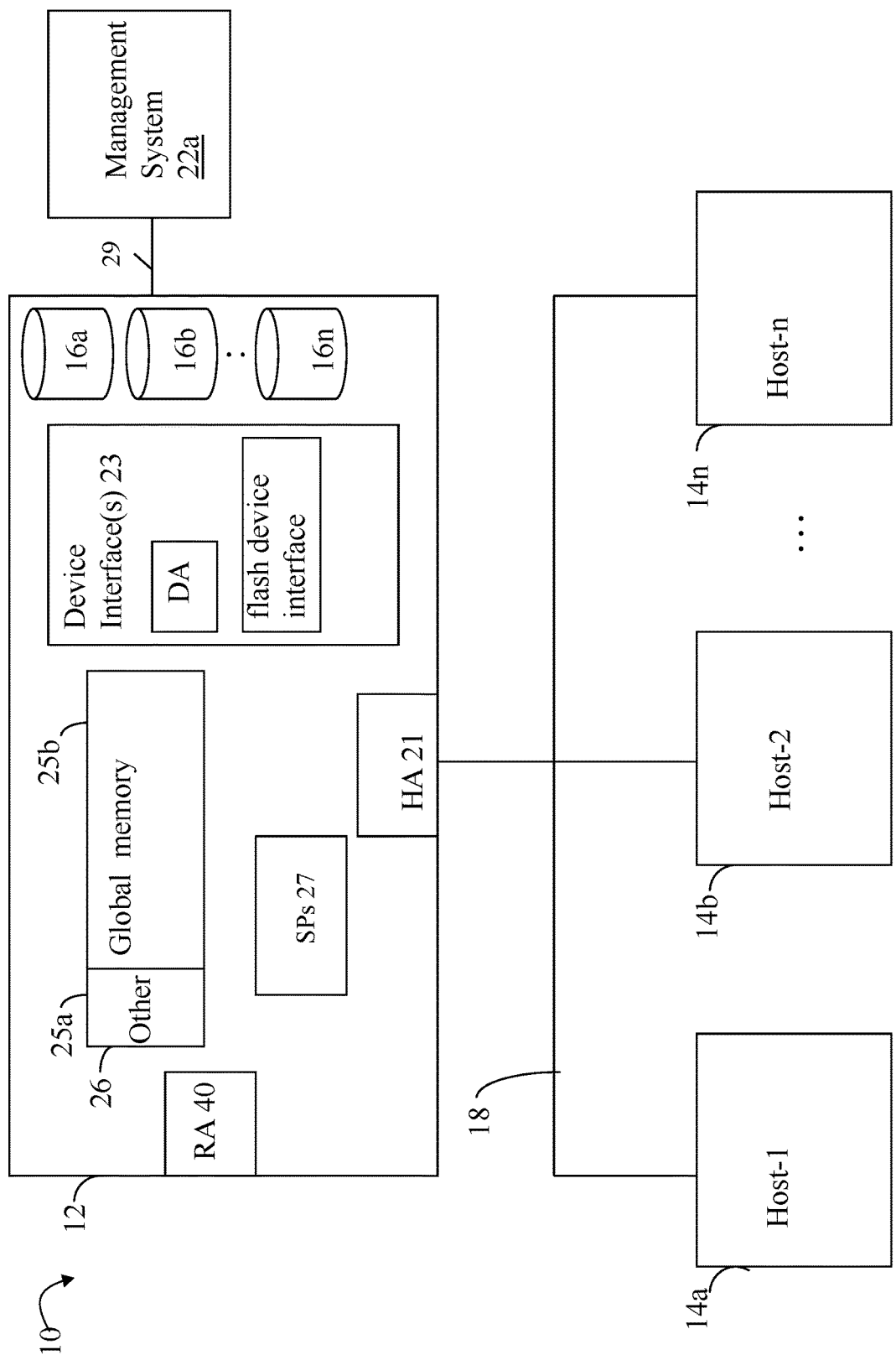
FIGS. 1 and 2B are examples of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with the techniques herein may perform different data processing operations or services on stored user data. For example, the data storage system may perform one or more data reduction operations, such as data deduplication. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication techniques are known in the art and any suitable such technique may be used in an embodiment in accordance with techniques herein. In at least one embodiment in accordance with techniques herein, data deduplication processing performed may include digest or hash value computation using an algorithm such as based on the SHA-256 cryptographic hashing algorithm known in the art. Data deduplication generally refers to removing redundant or duplicate data portions. Data deduplication techniques may include looking for duplicate data blocks whereby only a single instance of the data block is retained (stored on physical storage) and where pointers or references may be used in connection with duplicate or redundant copies (which reference or identify the single stored instance of the data block).

Figure 2A:
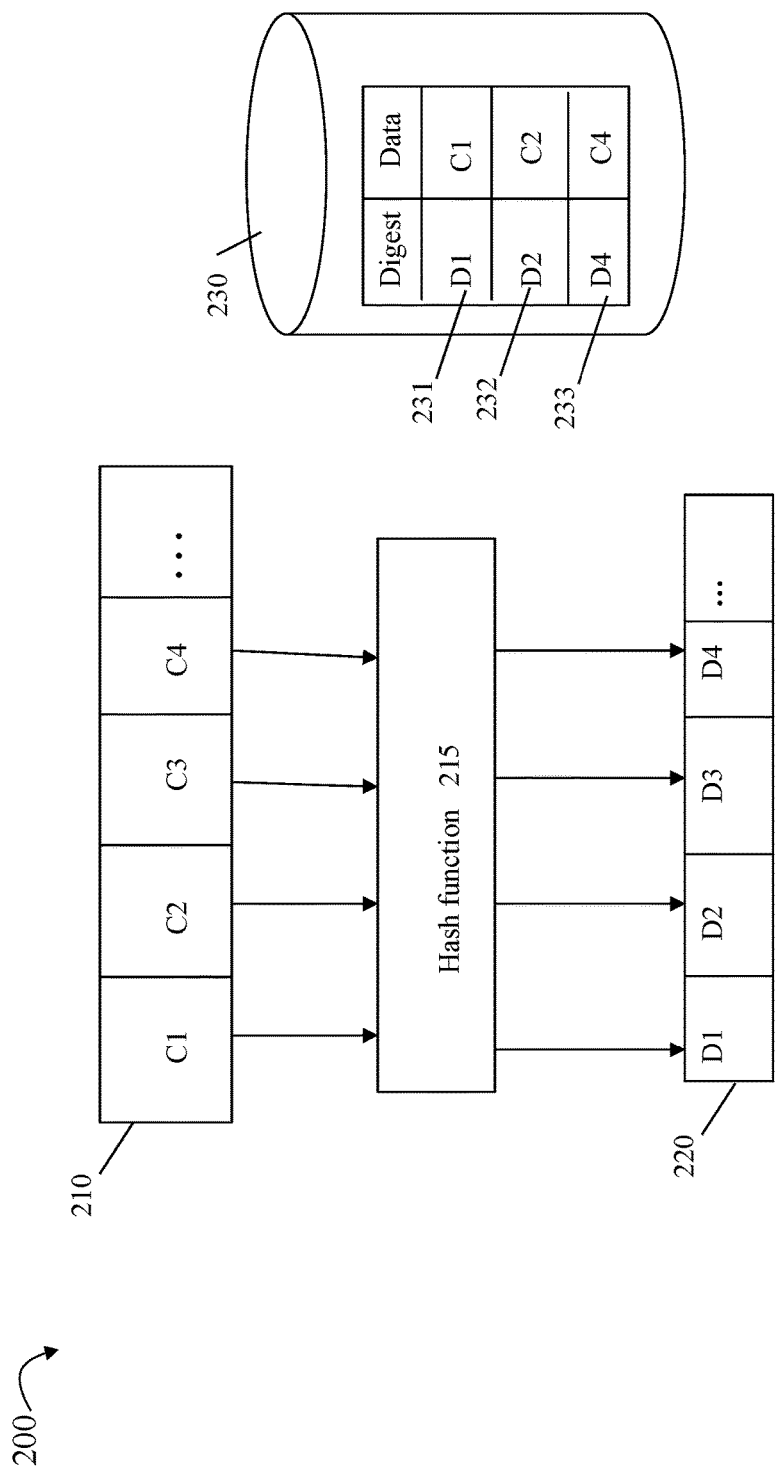
FIG. 2A is an example illustrating data deduplication as may be performed in an embodiment in accordance with the techniques herein.

Referring to the FIG. 2A, shown is an example 200 illustrating processing that may be performed in connection with data deduplication processing in an embodiment in accordance with techniques herein. The element 210 may denote the original data being written or stored on back-end non-volatile storage. The original data may be partitioned into multiple data blocks C1, C2, C3, C4 and the like. In at least one embodiment and for purposes of illustration, the data blocks may all be the same size where the size may vary with embodiment. Each block is provided as an input to hash function 215. As noted above, in at least one embodiment, the hash function 215 may be the SHA-256 hashing algorithm, or more generally, any suitable cryptographic, or non-cryptographic hashing function known in the art. For each block of 210, the hash function 215 may perform processing and generate, as an output, a hash value, hash or digest derived from the block 210. The element 220 includes hashes D1, D2, D3, D4, and the like, where a corresponding different one of the hashes DN is generated for each one of the blocks CN (where "N" is an integer denoting the block and associated hash value generated for that block). For example, D1 is the hash generated for C1, D2 is the hash generated for C2, D3 is the hash generated for C3, and so on. Generally, a hash function 215 is selected which has an acceptably low probability of a "hash collision" of generating the same digest or hash value for two different blocks. The strength of the hash function 215 may be measured by the unlikelihood of a collision occurring where two different input blocks of data produce the same hash. The strength increases with the bit length of the hash value, hash or digest. Thus, if two blocks, such as C1 and C3, have the same hashes whereby D1=D3, then blocks C1 and C3 match (e.g., are identical matching data blocks). If two blocks, such as C1 and C4, have different hashes whereby D1 does not equal D4, then blocks C1 and C4 do not match (e.g., are different or non-matching data blocks). In cases where two matching or identical blocks have the same hash, only a single copy of the data block is stored on backend non-volatile physical storage of the data storage system. The single stored instance of the data block may be referenced using a pointer, handle, the hash of the block, and the like.

The element 230 of the FIG. 2A may denote the data store, such as a data base (DB) used to store data blocks. In this example, as noted above, assume blocks C1 and C3 are the same with remaining blocks C2 and C4 being unique. In at least one embodiment, the data store 230 may be organized and managed using a data structure, such as a hash table. In at least one embodiment, computed hashes, or portions thereof, may be used as an index into the hash table where the single unique instances of data blocks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the block of data may be mapped by hash function 215, and thus by the block's hash, to a particular entry in the table at which the block of data is stored. To further illustrate, the hash function 215 may be used to generate a hash value, hash or digest for a particular data block. The hash is then further mapped (e.g., such as by another mathematical function, using particular portions of the hash, and the like) to a particular index or entry of the hash table. The particular mapping used to map the hash to a corresponding table entry varies, for example, with the hash and the size of hash table.

When storing a new data block, such as C1, its hash may be mapped to a particular hash table entry 231 whereby if the table entry is null/empty, or otherwise does not already include a data block matching C1, then C1 is stored in the table entry along with its associated hash D1 (this is the first time block C1 is recorded in the data store 230). Otherwise, if there is already an existing entry in the table including a data block matching C1, it indicates that the new data block is a duplicate of an existing block. In this example as noted above, processing is performed for C1, C2, and C4 respectively, where entries 231, 232, and 233 are added since there are no existing matching entries in the hash table. When processing block C3, as noted above, C3 has a hash D3 matching D1 whereby C3 (and thus D3) maps to entry 231 of the hash table already including a matching block C1 (so no additional data block is added to 230 for C3 since C3 is determined as a duplicate of C1). In connection with representing a particular file or other storage entity including multiple duplicate occurrences of a particular block such as C3, the single instance or copy of the data may be stored in 230. Additionally, a handle or reference, such as identifying the hash table entry 231, its hash, and the like, may be used to reference the single instance or copy of the data storage in 230. When reconstructing or restoring data to its original form, the handle or reference into the hash table for block C3 may be used to obtain the actual block C3 of data from 230.

Figure 2B:
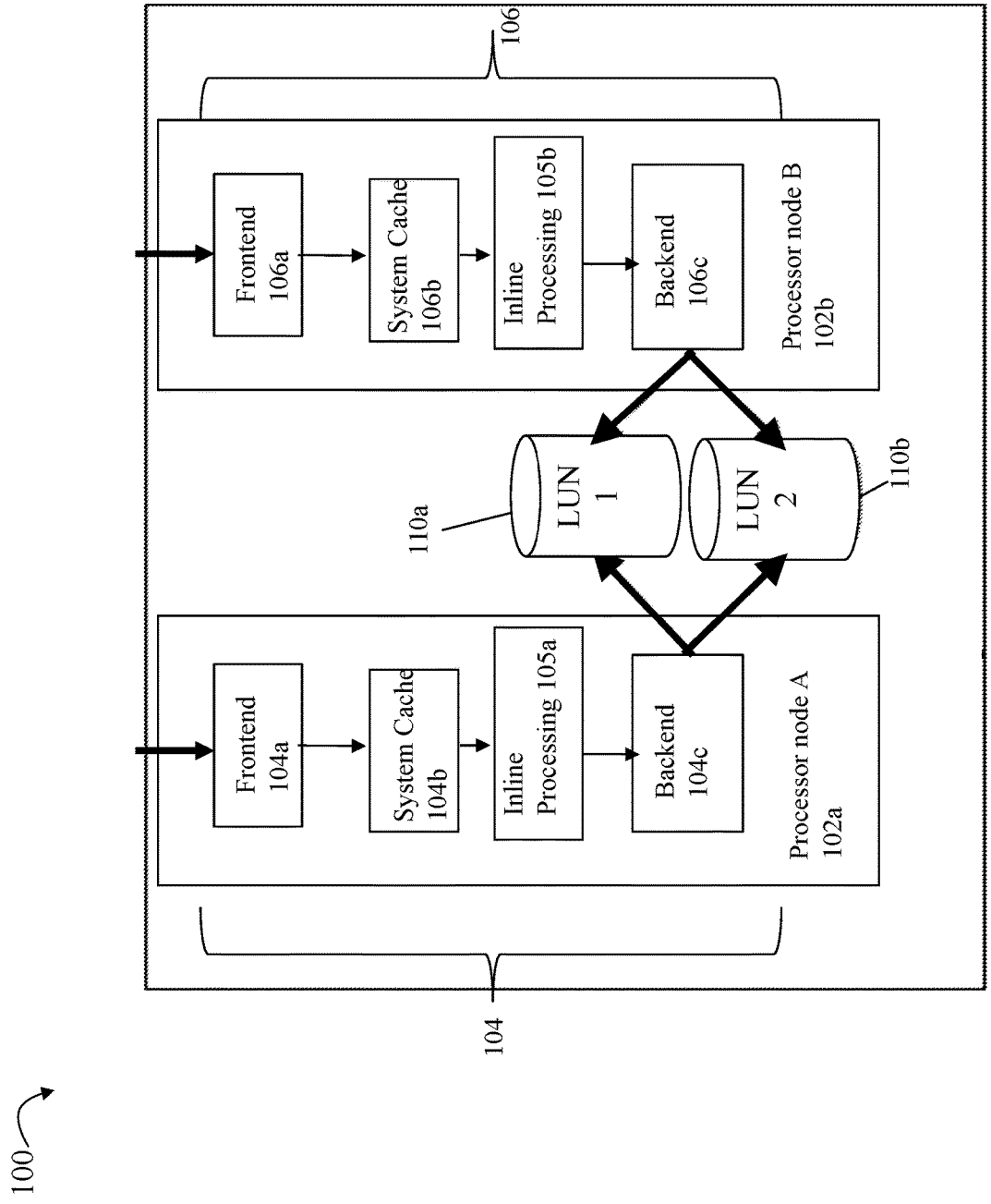

With reference to the FIG. 2B, shown is an example 100 illustrating components that may be included in the data path in at least one existing data storage system in accordance with the techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include performing data duplication. Although in following paragraphs reference may be made to inline processing including data deduplication, more generally, the inline processing may include performing any suitable or desirable data processing operations as part of the I/O or data path (e.g., where such operations may include data deduplication as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. The elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component 104a). At various points in time, the WP data stored in the system cache is flushed or written out to the physical storage 110a, 110b.

In connection with the inline processing layer 105a, prior to storing the original data on the physical storage 110a, 110b, data deduplication processing may be performed that converts the original data (as stored in the system cache prior to inline processing) to a resulting form (that may include deduplicated portions) which is then written to physical storage 110a, 110b. In at least one embodiment, when deduplication processing determines that a portion (such as a block) of the original data is a duplicate of an existing data portion already stored on 110*a*, 110*b*, that particular portion of the original data is stored in its deduplicated form.

In connection with a read operation to read a block of data, a determination is made as to whether the requested read data block is stored in its original form (in system cache 104*b* or on physical storage 110*a*, 110*b*), or whether the requested read data block was previously deduplicated. If the requested read data block (which is stored in its original non-deduplicated form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block was previously deduplicated, the read data block is recreated and stored in the system cache in its original form so that it can be returned to the host. Thus, requested read data stored on physical storage 110*a*, 110*b* may be stored in a deduplicated form as noted above where processing is performed by 105*a* to restore or convert the deduplicated form of the data to its original data form prior to returning the requested read data to the host.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage. For example, in at least one embodiment, a RAM based memory may be one of the caching layers used as to cache the write data that is then flushed to the backend physical storage.

When the processor performs processing, such as in connection with the inline processing 105*a*, 105*b* as noted above, data may be loaded from the main memory and/or other lower cache levels into its CPU cache. In particular, inline data deduplication (ILD) may be performed as part of the inline processing 105*a*, 105*b*. In at least one embodiment, the size of a data block processed by ILD may be 4096 bytes=4 kB (kilobytes) in size.

Some existing implementations of deduplication use a deduplication data store (dedupe data store or DB) as described in connection with the element 230 of the FIG. 2A having a hash table organized by indices which are randomly distributed and approximate a uniform distribution.

Since a global or complete dedupe data store for all data blocks stored in a system can be quite large, some existing implementations may only use a small cached portion of recently used hashes and associated entries for deduplication. In at least one existing implementation, the particular entries that are cached may be based on an LRU (least recently used) scheme such that the most recently used hashes have their associated entries stored in the cache. In at least one embodiment, only the cached portion of the dedup data store may be used for performing deduplication, such as part of the I/O or data path. In such implementations, once the hash and entry associated with a block is removed from the cache, deduplication processing may be unable to deduplicate against the block again since there may be no way to link a new incoming hash and block to its matching hash and block previously evicted or removed from the cache.

In at least one embodiment, the dedup data store may be stored on backend non-volatile storage PDs which can be costly (in terms of time) to access when performing data deduplication processing. To improve performance, caching may be used to cache portions of the dedup data store in the cache. However, the entire data store is typically not capable of being stored completely in the cache due to the often large size of the data store as compared to the limited size of the cache. Additionally, any cached portion of the data store may not be persistently stored where the cache thus requires repopulation upon reboot of the system.

Data deduplication may be performed at the data block level of granularity, for example, where each entry of the data store 230 is mapped to a single unique data block. As sometimes used herein, a target data block, target block or dedupe target refers to a single unique instance of a data block currently stored in the dedupe data store 230. Also sometimes used herein, reference is made to a candidate data block, candidate block or dedupe candidate that refers to a data block for which deduplication processing is performed with the goal of eliminating duplicate candidate blocks from being stored. A hash may be computed for the candidate data block using a hash function whereby the hash identifies the candidate data block with a high level of uniqueness, even though the hash is typically much smaller than the candidate data block itself. Hashes thus enable data block matching between the candidate and target data blocks in the dedupe data store 230 to proceed quickly and efficiently. Consistent with discussion above, for each hash in an entry of the dedupe data store 230, the data store 230 may store a pointer that leads to a stored version of the respective target data block. To perform deduplication on a particular candidate block, a storage system computes a hash of the candidate block and searches the dedupe data store 230, or a cached version thereof, for an entry that matches the computed hash. If a match is found, the storage system may then compare the actual content of the target block with the content of the candidate block to ensure the target and candidate data blocks having matching content. If the target and candidate data blocks having matching content, processing may arrange metadata of the candidate block to point to the target data block that the dedupe data store 230 has associated with the matching hash. In this manner, a duplicate copy of the data block is avoided.

Described in following paragraphs are techniques that may be used in connection with deduplication that select particular entries of the dedupe data store to be stored in the cache based on an inference made using a table of information for a subset of hashes. In at least one embodiment, the information of the table may be used in determining whether or not to perform deduplication for a candidate data block having a derived hash value and whether or not to store an entry of the dedupe data store for the derived hash value in the cache. The subset of hashes may be selected from the entire set of possible hashes that may be generated for data blocks in connection with deduplication. The subset of hashes may be selected in any suitable manner. For each hash in the subset, an entry may be included in a table that stores information such as statistics for multiple data sets, such as multiple LUNs. For a single hash value having a corresponding entry in the table, the information of the corresponding entry may include statistics. The statistics may include a reference count for each of the data sets, where the reference count identifies the number of duplicate data blocks in the data set having the single hash value. In this manner, an entry of the table associated with a hash value for a data block may indicate the reference count for a data set denoting the number of times the same data block with the hash value occurs in the data set. Collectively, all reference counts of a single entry associated with a hash value derived from a data block may denote the aggregate or total number of times the data block is repeated or duplicated across all data sets.

In at least one embodiment, the information in the table may be used to determine a deduplication rate for each of the multiple data sets having statistics stored in the table. From the deduplication rate of the data set determined based on the information gathered in the table for the subset of the hashes, the techniques herein may infer or apply the deduplication rate to all hashes of data blocks stored in the data set. The deduplication rate for a data set may be used to determine whether to perform deduplication processing for a candidate data block and whether to store a dedupe data store entry including the hash value for the candidate data block into the cache. Generally, in at least one embodiment, the deduplication rate for a data set, such as LUN, that is based on observed deduplications for the subset of hash values is used to predict an expected deduplication rate with respect to subsequent data written to the same data set.

In at least one embodiment in which at least some of the dedup data store is stored in-memory or in the cache, the techniques described herein may be used to selectively place portions of the dedupe data store in the cache or memory. Thus, the techniques described in following paragraphs may be used to determine which entries for hashes are stored and remain in the cache for a time period in one embodiment which only uses the cached partial dedup data store. The techniques herein may also be used in an embodiment in which the dedupe data store may be stored in a combination of the cache or memory and on-disk, where the techniques herein may be used to determine which entries for hashes are stored in the cache at different points in time.

In at least one embodiment, the techniques herein may be used to infer, predict or generally determine whether a candidate data block has a sufficiently high likelihood (e.g., above a specified threshold level) of having a deduplication hit where the candidate block is expected to be a duplicate of another block that may be written such as in the I/O path or data path.

In at least one embodiment, the techniques herein may be used to reduce the amount of cache consumed or used for storing entries of the dedup data store by identifying data sets, such as LUNs, having a poor or low chance (e.g., below a specified threshold level) of having deduplicated data. For writes of data blocks to such a data set, deduplication processing may be omitted and hashes of such data blocks may not be included in the cached dedupe data store.

The techniques described in the following paragraphs provide for self-correction and dynamically adjusting over time as the likelihood and potential for successful deduplication changes over time for the different data sets.

The foregoing and other aspects of the techniques herein are described in more detail in following paragraphs.

Referring to FIG. 3, shown is an example 300 of the deduplication (dedupe) data store 312 that may be used in an embodiment in accordance with the techniques herein. The dedupe data store 312 is configured to store hashes of the target blocks along with associated information. The dedupe data store 312 may include the following columns of information: the data block hash 302 and the location 304. Each entry or row of the dedupe data store 312 may include information for a different single target block.

In at least one embodiment, the entire dedupe data store 312 may be stored on persistent storage, such as non-volatile storage PDs, where the entire dedupe data store 312 may include information for each data block stored on the backend PDs. Additionally, part of the dedupe data store 312 may be stored in a cache for use in performing deduplication processing. Thus, the techniques described in following paragraphs may be used in selecting the particular entries of the dedupe data store 312 that are stored in the cache at different points in time.

As a variation, an embodiment may not maintain and may not persistently store a complete entire dedupe data store for all data blocks stored on the data storage system. Rather, such an embodiment may only maintain and store in the cache a small incomplete dedupe data store for only a small number of entries. In such an embodiment, the techniques herein described in following paragraphs may also be used in selecting the particular entries of the dedupe data store 312 that are stored in the cache at different points in time.

In at least one embodiment, the block hashes of the column 302 may be computed using a hash function, such as a cryptographic hash function, for each of the target data blocks. The location 304 may take various forms. The location 304 may generally directly or indirectly identify a location (e.g., in memory or on persistent storage) where the content of a target data block is stored. For example, the location 304 may point to a memory location in the cache where the data block is temporarily being held. Alternatively, the location 304 may point to metadata that is further mapped to the data block, such to a persistently stored version of the data block as stored on non-volatile physical storage, such as on one of the PDs 16a-n of FIG. 1. In this latter instance, the content of the target block may be obtained indirectly using the metadata. In some examples, the location may point directly to the data block stored persistently on non-volatile physical storage, such as on one of the PDs 16a-n of FIG. 1.

In at least one embodiment, the dedupe data store 312 may be stored persistently on non-volatile storage and, as noted above, some of the dedupe data store 312 may be stored in a cache. The entries of the cached version of the dedupe data store 312 may identify a location of a target data block in cache or on non-volatile storage. In at least one embodiment, when evicting an entry from the cached version of the dedupe data store 312 where the location of that entry identifies a cache location, the target data block referenced by the location of that entry may also be evicted from the cache. In at least one embodiment, deduplication processing may be performed using only the portion of the dedupe data store currently in the memory or the cache without retrieving other portions of the dedupe data store from the non-volatile storage. In other words, if a look up for a hash of a candidate block is performed and there is no matching entry in column 302 in the cached portion of the dedupe data store 312, in such an embodiment there is no further lookup in the on-disk dedupe data store and processing determines that there is no entry in the dedupe data store for the hash (e.g., block is unique and not a duplicate) and the candidate block is not deduplicated (deduped). As a variation, deduplication processing may be performed by first using the portion of the dedupe data store currently in the memory or the cache to search for a matching entry for a hash of a candidate block. If a match is not found using the cached portion of the dedupe data store, deduplication processing may then search for a matching entry in other portions of the dedupe data store on the non-volatile storage.

When performing deduplication processing for a candidate block, at least one embodiment of the techniques herein may include computing the hash for the candidate block and comparing the computed hash for the candidate to the hash entries in column 302 of the dedupe data store 312 to determine whether there is a match between the computed block hash for the candidate and a hash of the column 302 of an entry for a target block of the dedupe data store 312. If a match is found, processing may then be performed to compare (e.g., byte-by-byte) the content of the candidate block with the content of the target block having the matching entry of the dedupe data store and ensure the actual data contents of the candidate and target blocks match. If the actual contents of the candidate and target blocks match, processing then proceeds to store the candidate block as a full deduplicated block (e.g., duplicate of the target block).

Consistent with discussion elsewhere herein, for a candidate block that is found to be unique (e.g., whereby there is no matching target block), the candidate block may be stored as a new target block and processing may include persistently storing the content of the new target block and additionally storing an entry with the hash for the new target block in the dedupe data store 312. In at least one embodiment, such processing for the new target block may include creating a corresponding entry for the new target block in the dedupe data store 312 including the block hash 302 and location 304 for the new target block. As described elsewhere herein in more detail, an embodiment in accordance with the techniques herein may use information in a table for a subset of hashes to determine whether to perform deduplication processing for a candidate block and whether to store an entry for the candidate block and its derived hash in the cache.

An embodiment in accordance with the techniques herein may specify one or more selection criteria for selecting a subset of hashes. The subset may be selected from the set of all possible hashes that may be generated by the hash function used in deduplication processing to generate hash values for data blocks. Put another way, in an embodiment storing the full or complete dedupe data store for all data blocks stored on backend PDs, the set of all hash values may include all hash values in the full or complete dedupe data store (e.g., all hash values in the index or hash column 302). Generally, any suitable selection criteria may be used to define the subset of hash values. For example, in at least one embodiment, the selection criteria may be a hash prefix of a specified 8 bit or byte pattern defining hash values included in the subset. In this manner, the subset includes 1/256 of the number of total hashes in the full dedupe data store. As a variation, an embodiment may specify a longer prefix, for example, of 12 bits so the subset of hashes includes 1/4096 of the number of total hashes in the full dedupe data store. However, as noted elsewhere, the one or more selection criteria may generally be any suitable criteria used to select the subset of hashes.

An embodiment in accordance with the techniques herein assumes that properties or attributes of a portion or subset of a data set, such as based on the subset of hashes, apply to the entire data set. This is due to the general nature of the range of hashes generated by the hash function that approximates a uniform distribution of the generated hashes. In this case, an embodiment in accordance with the techniques herein may select a portion or subset of the data set meeting the one or more selection criteria to evaluate in order to determine properties or attributes as collected in the table that are then applied for use with the entire data set.

In at least one embodiment in accordance with the techniques herein, each data set may be logically defined. The data set may generally be a logical storage entity defined to include any portions of data. For example, a data set may include a single LUN, one or more sub-LUN portions from a single LUN, multiple LUNs, specified sub-LUN portions from multiple LUNs, and the like. The data set may also be defined using other storage entities besides LUNs. For example, the data set may be defined based on file system, files, directories, file shares, and the like. In some embodiments, the data set may be user defined. For simplicity of illustration, the following examples define each data set in terms of a single LUN, where each LUN may denote a different data set. However, more generally, the techniques herein may be applied to any suitable data set.

In the following examples for simplicity, a hash value derived from a data block is denoted using 4 letters and the selection criterion specifies the hash prefix A, where the subset of hash values includes all hashes beginning with "A". In at least one embodiment, information for the subset of hash values may be stored in a table that is indexed by the hash values.

As noted above such as in connection with FIG. 2B, each data block written may be stored in the cache, marked as write pending, and then subsequently flushed or destaged to the backend PDs from the cache. The data block may be written to a target logical address, such as a LUN and an LBA in the LUN's logical address space. Prior to storing the data block to physical storage in the backend PDs (e.g., as part of the inline processing 105a, 105b of FIG. 2B) mapped to the target logical address, processing in accordance with the techniques herein may be performed. The hash value for the data block may be computed and then evaluated to determine whether the hash value is included in the subset of hash values having information stored in the table. If the hash value is included in the subset, the information collected in the table for the hash value is updated, and then processing of the data block continues. If the hash value is not included in the subset, information stored in the table is not updated based on the data block and processing of the data block continues. In at least one embodiment, the computed hash value for the data block is used to index into the table to locate a corresponding entry for the hash value. Generally, as discussed below, a per LUN reference count may be maintained for a hash in the table, where the per LUN reference count is incremented by 1 each time a data block having the hash value is written to the LUN. Additionally, an embodiment may similarly decrement each reference count for a LUN as the data block associated with the hash value is deleted or removed from the LUN.

Figure 4:
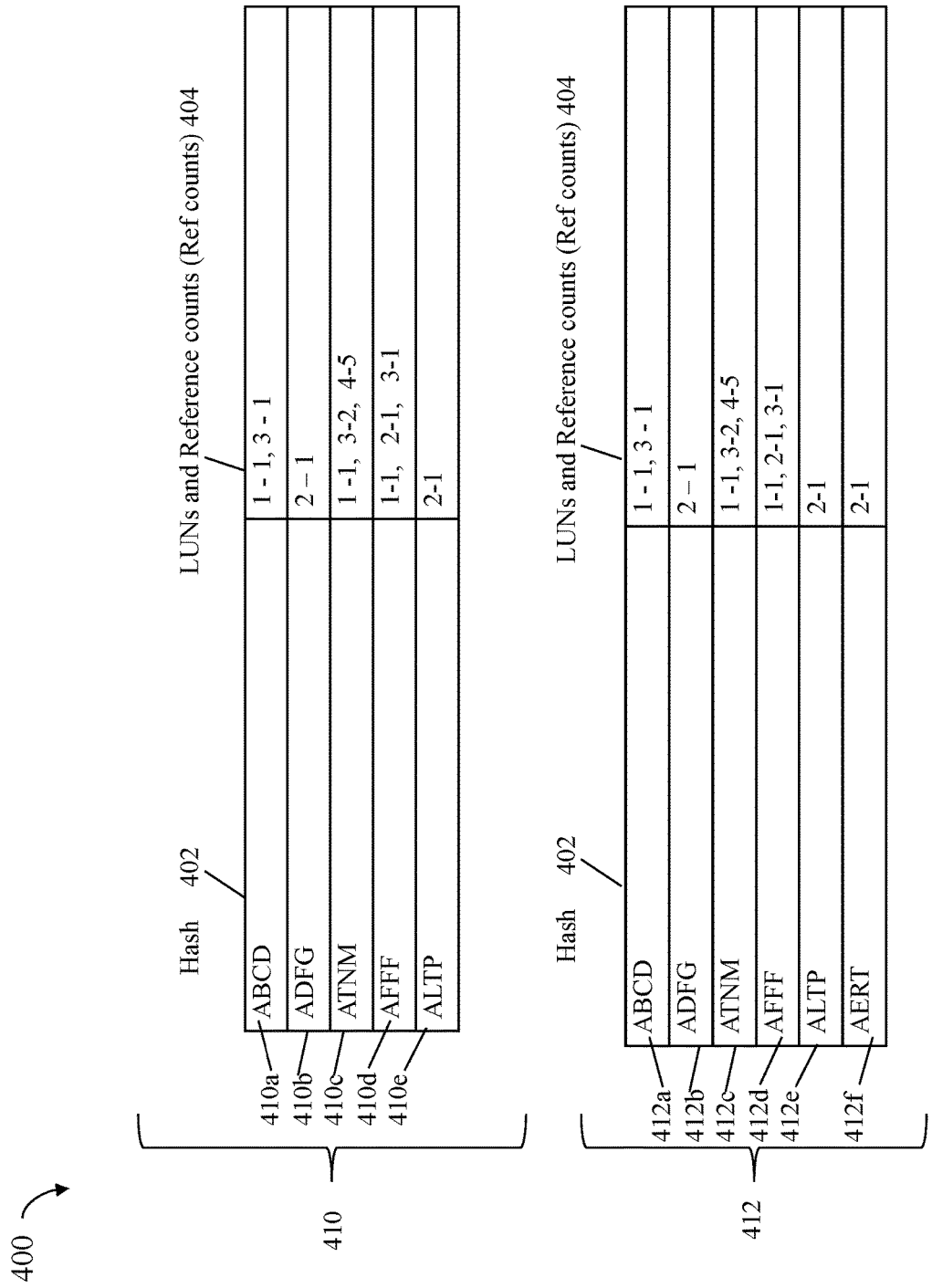
FIGS. 4 and 5 are examples of tables of information for subsets of hashes that may be used in an embodiment in accordance with the techniques herein.

What will now be described with reference to FIG. 4 is an example of the table and information that may be stored in the table for the subset of hash values in an embodiment in accordance with the techniques herein.

Referring to FIG. 4, the element 410 illustrates information that may be included in a table for the subset of hash values beginning with "A" at a first point in time T1. The table 410 includes a column 402 of hashes and a column 404 of LUNs and reference counts. Each entry of the table 410 includes a different one of the hash values in the subset in column 402, and information in the column 404 that is collected for the hash value of the entry. In this example, for an entry having a hash value (in column 402) derived from a particular data block, the information collected in the column 404 of the entry identifies each LUN that includes the particular data block and an associated reference count identifying the count or number of times that the particular data block is referenced and therefore stored on the LUN. In this example, each LUN and a corresponding reference count for the LUN in the column 404 is denoted using an integer pair, "I1-I2", wherein I1 and I2 are integers greater than zero, where I1 denotes the LUN and I2 denotes the reference count for the LUN I1. For example, entry 410a indicates that for the hash "ABCD" derived from a data block B1, the data block B1 is stored on LUN 1 once (as denoted by "1-1") and is stored on LUN 3 once (as denoted by "3-1"); entry 410b indicates that for the hash "ADFG" derived from another data block B2, the data block B2 is stored on LUN 2 once (as denoted by "2-1"); entry 410c indicates that for the hash "ATNM" derived from another data block B3, the data block B3 is stored on LUN 1 once (as denoted by "1-1"), stored on LUN 3 twice (as denoted by "3-2"), and stored on LUN 4 5 times (as denoted by "4-5"); entry 410d indicates that for the hash "AFFF" derived from another data block B4, the data block B4 is stored on LUN 1 once (as denoted by "1-1"), LUN 2 once (as denoted by "2-1"), and is stored on LUN 3 once (as denoted by "3-1"); and entry 410e indicates that for the hash "ALTP" derived from another data block B5, the data block B5 is stored on LUN 2 once (as denoted by "2-1").

Now assume a new write I/O operation W6 writes data block B6 that is stored in the cache and marked as write pending, and then at time T2 is subsequently destaged or flushed from the cache. At this time T2, processing may be performed to determine the hash H6 for B6, where H6=DFGH. Processing may determine whether H6=DFGH is included in the subset of hash values. In connection with the example 400, the subset of hashes may be those hashes having the hash prefix=A as noted above. For the hash H6=DFGH, processing determines that H6 is not included in the subset of hash values so information in the table is not updated for the hash H6=DFGH. Processing continues for the data block B6 consistent with discussion elsewhere herein in connection.

The table 410 reflects the content of the table of information for the subset of hash values in this example subsequent to time T2 but prior to a time T3 discussed below. The table 412 may reflect the content of the table of information for the subset of hash values in this example subsequent to time T3 after the table has been updated in connection with a new write I/O operation W7.

The new write I/O operation W7 writes data block B7 that is stored in the cache and marked as write pending. Subsequently, at the time T3, the data block B7 is destaged or flushed from the cache. At this time T3, processing may be performed to determine the hash H7 for B7, where H7=AERT. Processing may determine whether H7=AERT is included in the subset of hash values. In connection with the example 400, the subset of hashes may be those hashes having the hash prefix=A as noted above. For the hash H7=AERT, processing determines that H7 is included in the subset of hash values so information in the table is updated for the hash H7=AERT. Assume further that the write W7 writes to the target logical address LUN 2, LBA 100. The hash H7=AERT is used to index into the table to locate an entry for the hash H7. In this case, a new entry 412f may be added to the table for the hash H7=AERT (column 402) and the information added in the column 404 may indicate that data block B7 having the hash H7=AERT is stored on LUN 2 once (as denoted by 2-1 in the column 404 of row 412f).

Once the information in the table has been updated from the contents as indicated by the element 410 to the contents as indicated by the element 412 to include the entry 412f, processing continues for the data block B7 consistent with discussion elsewhere herein.

The foregoing generally illustrates processing that may be performed in connection with data blocks that are flushed or destaged from the cache to physical storage on the backend PDs. The foregoing may be performed in an ongoing manner to maintain information in the table for the subset of hash values.

What will now be described are examples of how the information in the table such as illustrated by the elements 410 and 412 may be used in an embodiment in connection with deduplication processing in an embodiment in accordance with the techniques herein.

As described elsewhere herein, in at least one embodiment, the information in the table for the subset of hash values may be used to infer or generally determine whether to perform deduplication processing for a particular data block being written to the backend PDs and whether to insert a dedupe data store entry for the hash value derived from the particular data block into the cache. What will now be described is an example use of the information in the table 412 of FIG. 4.

At the time T4 subsequent to the time T3, a new write I/O operation W8 writes data block B8 that is stored in the cache and marked as write pending. The write I/O operation W8 may write B8 to the target logical address LUN 2, LBA=10. Subsequently, at the time T5, the data block B8 is destaged or flushed from the cache. At this time T5, processing may be performed to determine the hash H8 for B8, where H8=WXYZ. Processing determines that H8=WXYZ is not included in the subset of hash values having the hashing prefix A. Processing continues for the data block B8 to use the information in the table 412 to determine whether to perform deduplication processing for the block B8 and whether to store an entry of the dedupe data stored for the hash H8=WXYZ in the cache.

In at least one embodiment, a deduplication rate for LUN 2 may be determined using the information in the table 412 collected for the subset of hash values. Hash values of data blocks stored on LUN 2 are included in the entries 412b, 412d, 412e and 412f (as denoted by "2-1" in each of the entries 412b, 412d, 412e and 412f). The foregoing 4 entries indicate that for 4 data blocks stored on LUN 2 having hash values in the subset, only ¼ or 25% of the data blocks have been deduplicated or are duplicates. In particular entry 412d indicates that the data block B4 having the hash H4=AFFF is referenced 3 times. The remaining entries 412b, 412e and 412f correspond to data blocks stored on LUN 2 that are only referenced once.

In contrast, for example, consider the deduplication rates for LUNs 1, 3, and 4. Based on the table 412, the deduplicate rate is 100% for each of the LUNs 1, 3 and 4. Generally, an entry in the table 412 having an aggregate or total reference count greater than 1 means that the hash value for the entry is associated with a data block that has been successfully deduplicated. The aggregate or total reference count for the entry may be calculated as the sum of all reference counts in the column 404 of that entry. For example, for LUN 1, each entry of the table 412 that includes a hash value of data block referenced by LUN 1 has an aggregate total reference count with respect to all LUNs that is greater than 1. For example, entries 412a, 412c and 412d include hash values of data blocks stored on LUN 1, where entry 412a has an aggregate reference count of 2, entry 412c has an aggregate reference count of 8 and entry 412d has an aggregate reference count of 3. For LUN 3, each entry of the table 412 that includes a hash value of data block referenced by LUN 3 has an aggregate total reference count with respect to all LUNs that is greater than 1. For example, entries 412a, 412c and 412d include hash values of data blocks stored on LUN 2, where entry 412a has an aggregate reference count of 2, entry 412c has an aggregate reference count of 8 and entry 412d has an aggregate reference count of 3. For LUN 4, each entry of the table 412 that includes a hash value of data block referenced by LUN 4 has an aggregate total reference count with respect to all LUNs that is greater than 1. For example, entries 412a, 412c and 412d include hash values of data blocks stored on LUN 2, where entry 412a has an aggregate reference count of 2, entry 412c has an aggregate reference count of 8 and entry 412d has an aggregate reference count of 3.

In at least one embodiment, processing performed in connection with the data block B8 written to LUN 2 may examine the current deduplication rate for the LUN 2 as calculated using the information in the table 412 for the subset of hashes. The current deduplication for LUN 2 as determined using the information in the table 412 may be used to determine whether to perform deduplication processing for the data block B8. Generally, the deduplication rate for LUN 2 based on observed deduplications for the subset of hash values is used to predict an expected deduplication rate with respect to future data written to LUN 2. In at least one embodiment, the current deduplicate rate for LUN 2=25% may be compared to a minimum threshold deduplicate rate in order to determine whether to perform deduplication processing for B8. For example, an embodiment may specify a minimum threshold of 50% or 60%. In this case, the deduplication rate for LUN 2=25% is below the specified minimum threshold and processing may determine not to perform deduplication processing for the block B8, and additionally, an entry of the dedupe data store for the hash H8 derived from the block B8 may not be stored in the cache.

In at least one embodiment in which the complete dedupe data store is stored on disk and a selected portion of the dedupe data store is store in the cache, data deduplication processing may be performed for the block B8 and the on disk dedupe data store, but not the in the cache portion, may be updated to include an entry for the hash H8 derived from the data block B8.

At the time T6 subsequent to the time T5, a new write I/O operation W9 writes data block B9 that is stored in the cache and marked as write pending. The write I/O operation W9 may write B9 to a target logical address on LUN 1. Subsequently, at the time T7, the data block B9 is destaged or flushed from the cache. At this time T7, processing may be performed to determine the hash H9 for B9, where H9=WWWW. Processing determines that H9=WWWW is not included in the subset of hash values having the hashing prefix A. Processing continues for the data block B9 to use the information in the table 412 to determine whether to perform deduplication processing for the block B9 and whether to store an entry of the dedupe data stored for the hash H9=WWWW in the cache.

Based on the above discussion, the deduplication rate for LUN 1 is 100% which exceeds the specified minimum threshold of 50% or 60%. In this case, the deduplication rate for LUN 1=100% exceeds the specified minimum threshold and processing may determine to perform deduplication processing for the block B9, and additionally, an entry of the dedupe data store for the hash H9 derived from the block B9 may be stored in the cache.

In at least one embodiment in which the complete dedupe data store is stored in on disk and a selected portion of the dedupe data store is store in the cache, data deduplication processing may be performed for the block B9 and both the on disk dedupe data store and the cached portion of the dedupe data store may be updated to include an entry for the hash H8 derived from the data block B8.

Thus, the information in the table 412 based on a subset of the hashes may be used to determine whether to perform deduplication processing for a data block. Additionally, the information in the table 412 based on a subset of the hashes may be used to determine whether to add an entry for the hash of the data block into the cached portion of the dedupe data store. More generally, the information in the table 412 based on a subset of the hashes may be used to determine where (e.g., the cache, on-disk, particular caching level), if at all, to add an entry for the hash of the data block.

In an embodiment using only a small cache that caches a portion of the hash values, the techniques herein may use the information in the table 412 based on the subset of hash values to determine whether to store an entry for the hash value in the cache.

In an embodiment storing a complete or full dedupe data store on disk and a portion or subset of the full dedupe data store in the cache, the techniques herein may use the information in the table 412 based on the subset of hash values to determine whether to store an entry for the hash value in the cache.

In yet another embodiment, different portions of the dedupe data store may be tiered and stored in different levels of a cache. For example, assume there are three caching layers or levels L1, L2 and L3 used in connection with storing portions of the entries of the dedupe data store. L1 may be the first or highest cache level, L2 may be the second or mid cache level, and L3 may be the $3^{rd}$ or lowest caching level. In such an embodiment, when searching for a matching entry in the dedupe data store for a candidate data block B having a hash H, processing may be performed by traversing the caching level sequentially, in order from L1-L3, and examining the entries stored in each such caching level. Consistent with discussion elsewhere herein, searching stops when a matching existing entry for H corresponding to the candidate data block B is located in one of the caching levels L1, L2 or L3. If processing locates a matching entry for H in the entries of the dedupe data store in the Ln cache, searching stops. If all dedupe data store entries in all caching levels are searched and no matching entry is located, processing may determine that the candidate data block B unique and is not deduplicated with respect to a target block. In such an embodiment, the techniques herein may use the information in the table 412 to select a particular one of the 3 caching levels in which to place an entry including the hash H for the candidate data block B. For example, multiple deduplication rate threshold ranges may be specified for each of the 3 caching levels. For example, the cache level L1 may be used for storing entries associated with hash values of data blocks in data sets, such as LUNs, having a deduplication rate >X1%; the cache level L2 may be used for storing entries associated with hash values of data blocks in data sets, such as LUNs, having a deduplication rate less than or equal to X1% but greater than X2%; and the cache level L3 may be used for storing entries associated with hash values of data blocks in data sets, such as LUNs, having a deduplication rate that is equal to or less than X3%. Consider for example LUN 2 having a duplicate rate of 25% as described above. In this case, entries associated with hashes of data blocks stored on LUN 2 may be placed in the L3 cache if X3% is 40%. Consider also for example LUN 1 having a duplicate rate of 100% as described above. In this case, entries associated with hashes of data blocks stored on LUN 1 may be placed in the L1 cache if X1% is 80%. More generally, the techniques herein may be used in connection with any suitable number of caching levels.

In at least one embodiment in which entries of the dedupe data store may be stored in multiple caching levels or layers, an embodiment may vary whether different levels are utilized in accordance with the current workload or utilization of the data storage system. For example, consider an embodiment having 3 caching levels or layers as just described above. In such an embodiment, deduplication processing may always utilize the dedupe data store entries stored in the level L1 cache. As may be needed, an embodiment may look to lower caching levels, such as L2 and L3 depending on the system load. For example, as may be needed in deduplication processing, an embodiment may look to entries of the dedupe data store included in the L2 cache in addition to the L1 cache only if the system workload or utilization is below a specified level. Otherwise, only those entries in the L1 cache may be used. Furthermore, in at least one embodiment, the L3 cache of dedupe data store entries may only be used when performing offline deduplication, or more generally, not as part of the I/O or data path. For example, as discussed above, LUNs may be scanned to determine deduplication opportunities offline. In this case, the deduplication processing performed offline may use dedupe data store entries residing in all 3 caching levels (L1, L2 and L3). In at least one embodiment, the L1 cache may be a form of RAM or other fast memory. The L2 and L3 cache may be included in one or more forms of memory or storage that may be relatively slower in comparison to the L1 cache.

The techniques herein are adaptive to changes in data set deduplication rates over time. Thus, in one aspect, the techniques herein may be viewed as flexible, corrective and dynamic as will now be further illustrated with another example 500 with reference to FIG. 5. The example 500 described below illustrates the adaptive and flexible nature of the techniques herein using the information in the table regarding the subset of hashes.

Figure 5:
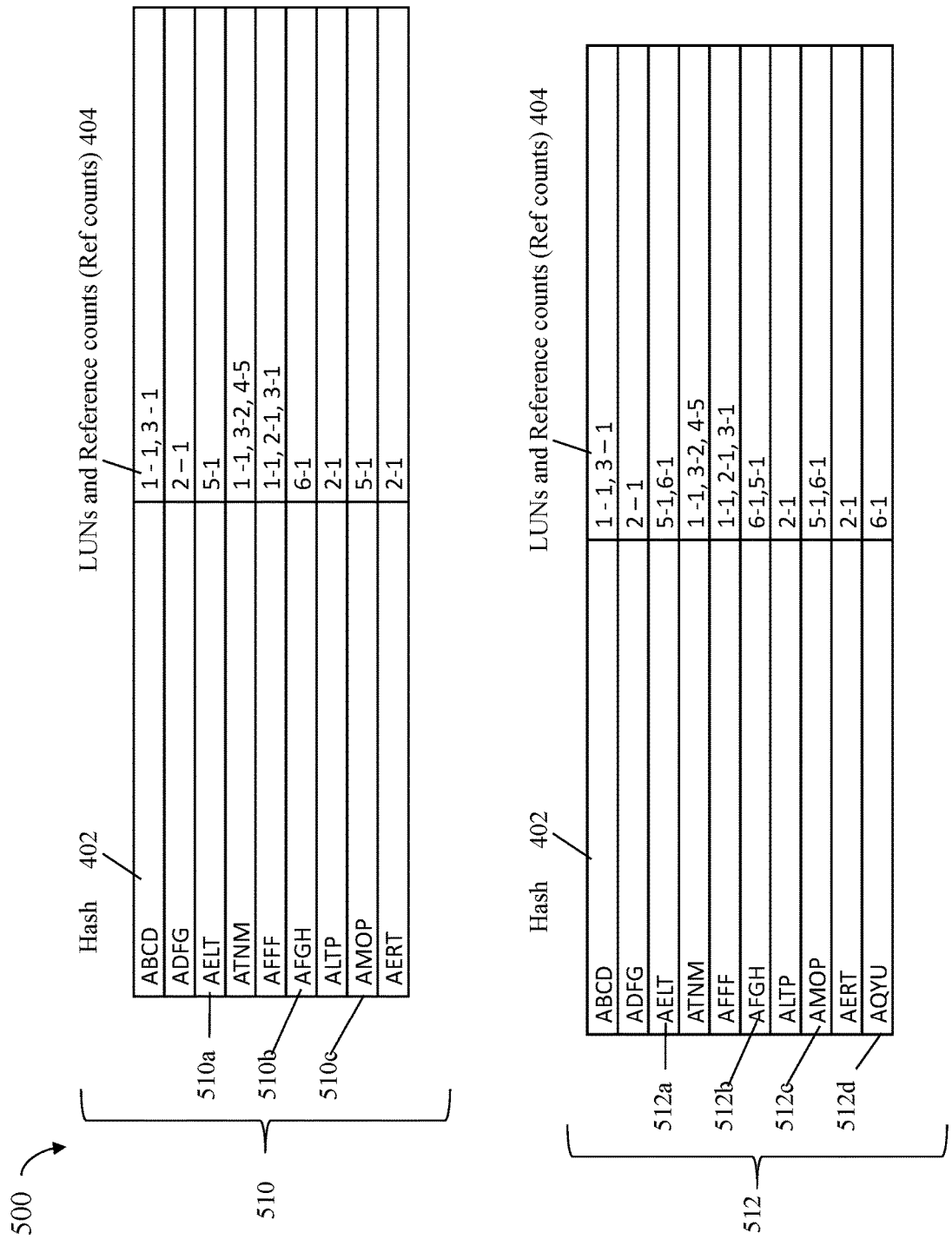

The table 510 of FIG. 5 may represent an updated subsequent version of the table 412 of FIG. 4. The table 510 may denote the information stored in the table at a time T11 in which 3 additional data blocks have been written to the LUNs 5 and 6 that are included in the subset of hashes. In particular, the table 510 includes 3 additional entries 510a-c in comparison to the entries in the table 412. The table 510 includes the entry 510a indicating that the hash H11=AELT derived from the data block B11 stored on LUN 5 is referenced once; the entry 510b indicating that the hash H12=AFGH derived from the data block B12 stored on LUN 6 is referenced once; and the entry 510c indicating that the hash H13=AMOP derived from the data block B13 stored on LUN 5 is referenced once.

Based on the information in the table 510 at the time T11, processing may initially infer not to perform deduplication processing for data blocks stored on the LUNs 5 and 6, and further, not to store entries for the hashes of such data blocks in the cache since each of the LUNs 5 and 6 have a deduplication rate of 0%. Based on recorded information collected in the table 510 for the subset of hash values, it appears that generally data blocks written so far to the LUNs 5 and 6 are not similar to other data blocks.

However, additional time may elapse from the point in time T11 during which additional write I/Os may be directed to LUNs 5 and 6, where subsequent processing at a time T12 may determine that the data stored on LUNs 5 and 6 is similar. In particular, some of the additional write I/Os may store blocks having associated hash values included in the subset of hash values, whereby the table 510 may be updated at time T12 to include information as illustrated in the table 512. The entries 510a-c of the table 510 have been updated respectively to entries 512a-c in the table 512. Additionally, the table 512 includes a new entry 512d. At the time T12, the table 512 includes the entry 512a indicating that the hash H11=AELT derived from the data block B11 is referenced by LUN 5 once, and is referenced by LUN 6 once; the entry 512b indicating that the hash H12=AFGH derived from the data block B12 is referenced by LUN 5 once and by LUN 6 once; the entry 512c indicating that the hash H13=AMOP derived from the data block B13 is reference by LUN 5 once and by LUN 6 once; and the entry 512d indicating that the hash H14=AQYU is referenced by LUN 6 once.

Based on the information in the table 512, processing may determine that the deduplication rate for LUN 5 is now increased to 100% and the deduplication rate for LUN 6 is now increased to 75%. Assuming a minimum threshold deduplication rate of 505 or 60%, both deduplication rates for the LUNs 5 and 6 exceed the minimum threshold deduplication rate. Subsequent to the time T12, deduplication processing (to search for deduplication opportunities) may be performed for data blocks written to the LUNs 5 and 6 and entries for the hash values derived from such data blocks may be stored in the cache.

Additionally, processing may be performed offline (e.g., not as part of the inline processing of the I/O or data path), such as by a background process or during periods of low or idle system workload, to scan the existing data stored in LUNs 5 and 6 for deduplication opportunities. This background or offline scanning of LUNs 5 and 6 may be performed to read the data from the LUNs and perform deduplication processing of stored data on the LUNs 5 and 6 to eliminate duplicate data. Additionally, during the scan, entries for hash values of the scanned data blocks of the LUNs 5 and 6 may be added to the cache.

The information stored in the different instances of the tables 410, 412, 510 and 512 at different points in time may be used in other suitable applications. For example, an embodiment may examine the table 512 to determine whether 2 LUNs have similar stored data and deduplicate with respect to the same set of hashes. For example, based on the information in the table 512, it may be determined that the high deduplication rates for LUNs 5 and 6 are due to the high similarity of the data on the LUNs 5 and 6 as indicated by the large number of hashes in common to both the LUNs 5 and 6. As such, an embodiment may, for example, want to move or migrate the 2 LUNs 5 and 6 together to keep both the LUNs 5 and 6 on the same data storage system for which deduplication is performed. Due to the dependent similarity of data between the LUNs 5 and 6, separating LUNs 5 and 6 on two different data storage systems may adversely affect the deduplication rate achieved for both LUNs. To further illustrate, take an extreme case where the LUN 5 and the LUN 6 are mirrors of one another and have duplicate data contents and the LUN 9 has no data in common with the LUNs 5 and 6. Assume that the information in the table collected for the subset of hashes indicates there is a 100% deduplication rate for both the LUN 5 and the LUN 6. However, the deduplication rates of both the LUNs 5 and 6 are dependent on both such LUNs being present and included in the same data storage system. Assume further that the table of information collected for the subset of hashes indicates that no other LUN in the system has any data block in common with LUN 5 or LUN 6. If an administrator decides to migrate LUN 5 to another data storage system separate from the current data storage system including LUN 6, the observed deduplication rate may drop to 0% for both LUNs (based on information in the table for the subset of hash values). Thus in at least one embodiment, a decision may be made to keep both LUNs 5 and 6 on the same data storage system (e.g., either migrate the pair of LUNs 5 and 6 to the same new data storage system or leave the pair of LUNs 5 and 6 on the current data storage system) due to the deduplication rate dependency among the pair of LUNs 5 and 6.

An embodiment in accordance with the techniques herein may store additional information than as illustrated, for example, in the tables of FIGS. 4 and 5. For example, in addition to storing the information as described above, an embodiment may record the logical addresses associated with each of the data block references. For example, consider the entry 510d having the hash H14=AQYU that may be derived from the data block B14. The data block B14 may be stored on LUN 6 at LBA 60. In this case, the entry 510d may further include in the column 404 the LBA 60 with the reference count of 1 for LUN 6 (e.g., denoted by 6-1 in the column 404 of the entry 510d). In connection with the offline or background scanning of LUNs 5 and 6, such logical addresses may be used to determine where to start such scanning.

Figure 6:
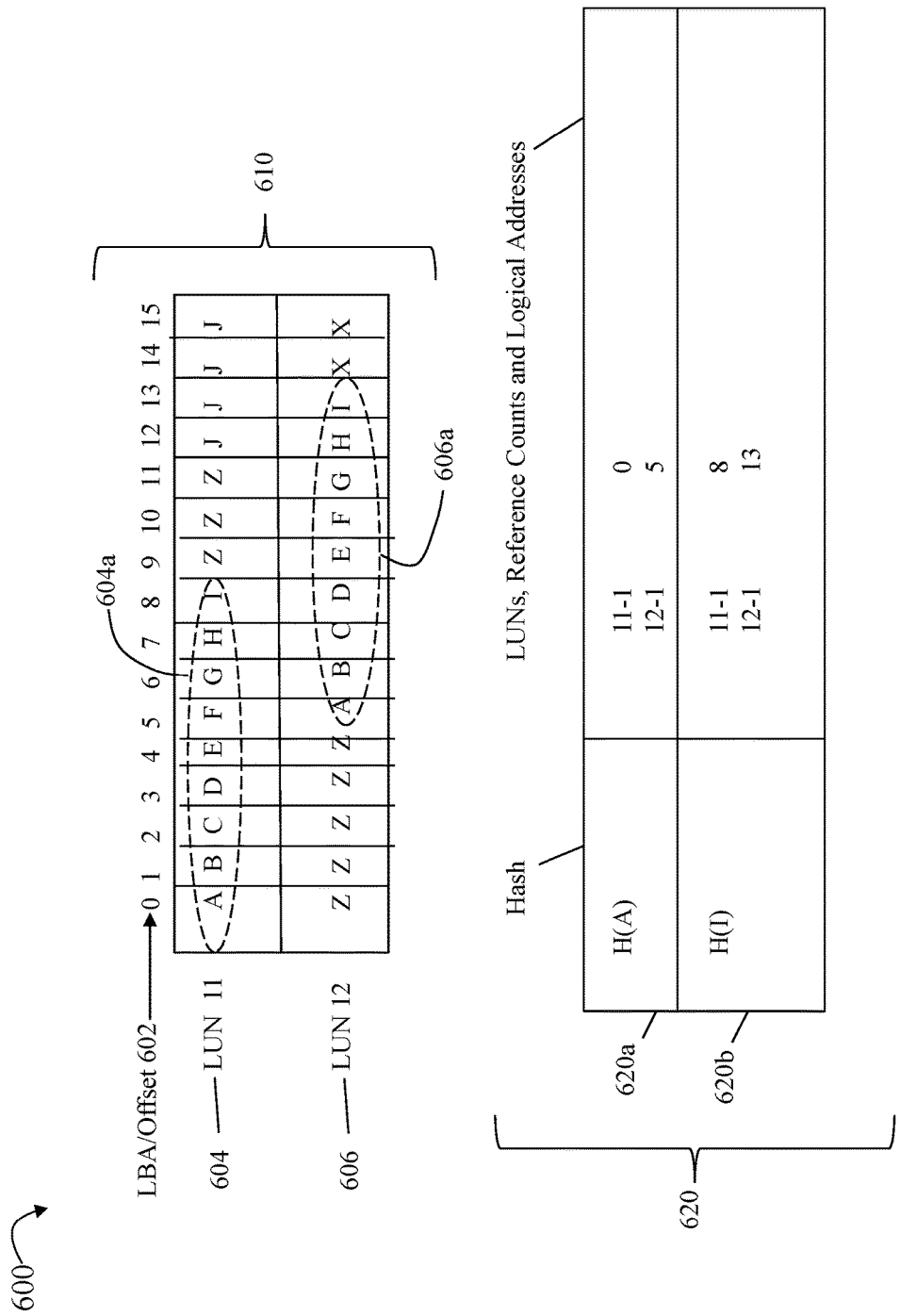
FIG. 6 is an example illustrating detection of misaligned duplicate data blocks in an embodiment in accordance with the techniques herein.

As another application in which the table includes the logical addresses of each reference to a data block having a hash in the table, such logical addresses of multiple entries and hash values may be used to detect matching logically sequential consecutive data blocks on two LUNs, where the matching sequence of the data blocks starts at different offsets on the two LUNs. To further illustrate, reference is made to FIG. 6.

In the example 600, the element 610 may denote the data stored at different LBAs of the LUN 11 604 and the LUN 12 606. The element 604a indicates the content stored at the LBAs 0-8 of the LUN 11, and the element 606a indicates the content stored at the LBAs 5-13 of the LUN 12. The element 620 indicates the information stored in the table for the subset of hash values. The table 620 includes columns of information as described above in connection with FIGS. 4 and 5 with the addition of logical addresses for the data block references. For data block "x", H(x) denotes the hash value derived from the data block or content "x". Thus, the entry 620a indicates H(A) for the data block A that is stored at LUN 11, LBA 0 and LUN 12, LBA 5; and the entry 620b indicates H(I) for the data block I that is stored at LUN 11, LBA 8 and LUN 12, LBA 13. An embodiment in accordance with the techniques herein may calculate the distance of 5 between the offsets or LBAs 0 and 5, respectively, for the LUNs 11 and 12 of the entry 620a; and may calculate the distance of 5 between the offsets or LBAs 8 and 13, respectively, for the LUNs 11 and 12 of the entry 620b. The same distances of the entries 620a, 620b may denote the length of potentially duplicate content that is stored at logically consecutive addresses on the two LUNs 11 and 12, where the data block content A having the hash H(A) is the beginning of the matching sequence and where the data block content I having the hash H(I) is the end of the matching sequence. However, for the two LUNs 11 and 12, the matching sequence of data blocks starts at the LBA 0 on the LUN 11 and starts at the LBA 5 on the LUN 12. Upon detecting that the above-noted distance of 5 is the same for each of the entries 620a, 620b, processing may be performed to scan and compare the content of both LUNs 11 and 12, beginning by comparing the starting offset LUN 11, LBA 0 with the starting offset LUN 12, LUN 5 of LUN 11, to look for deduplication opportunities in the next 8 blocks of both LUNs 11 and 12. The foregoing is an example of a sequence of logically consecutive data blocks that are duplicated on two different LUNs 11 and 12 but where the sequence of duplicate blocks start at different LBAs on each of the LUNs 11 and 12.

It should be noted that the foregoing examples illustrate the techniques herein with respect to full block deduplication where a full block is 4K. An embodiment may also utilize the techniques herein in connection with data blocks of other sizes. Additionally, an embodiment may also utilize the techniques herein with respect to hash values computed for sub-blocks where the sub-block hash values may be used in connection with performing partial block deduplication. For example, a 4K block may be partitioned into 8 equally sized sub-blocks that are each 512K bytes in size. A sub-block hash may be computed for each of the 8 sub-blocks in addition to computing the full block hash for the full 4K block. The sub-block hashes may be used in performing partial or sub-block deduplication where 2 full blocks do not match but where one or more sub-blocks of a candidate block may match one or more sub-blocks of a target block. Generally, any suitable technique may be used to perform sub-block deduplication between a candidate block and a target block. In such an embodiment, the techniques herein may be used to store a first table of information for a subset of full block hashes such as described above and additionally store a second table of information for a subset of the sub-block hashes. Using the techniques herein, a full block deduplicate rate for different data sets may be determined using the first table of information as described above. Additionally, a partial or sub-block deduplicate rate for different data sets may be determined using the second table of information. Some data sets may have a very low full block deduplicate rate and a very high partial or sub-block deduplication rate. In such cases, an embodiment may decide to selectively enable or disable each of the full block deduplication and sub-block deduplication for a data set depending on the corresponding full block deduplicate rate and a partial or sub-block deduplication rate. For example, for a LUN 2, its full block deduplication rate determined based on the first table of information may be less than the specified threshold, and therefore full block deduplication may be disabled for the LUN 2. However, for the LUN 2, its partial block deduplication rate determined based on the second table of information may be more than the specified threshold, and therefore partial or sub-block deduplication may be enabled for the LUN 2.

It should be noted that examples of the techniques herein are described above in connection with performing such techniques inline as part of the I/O or data path. More generally the techniques herein may be performed offline or more generally as processing that is not part of the I/O or data path.

Figure 7A:
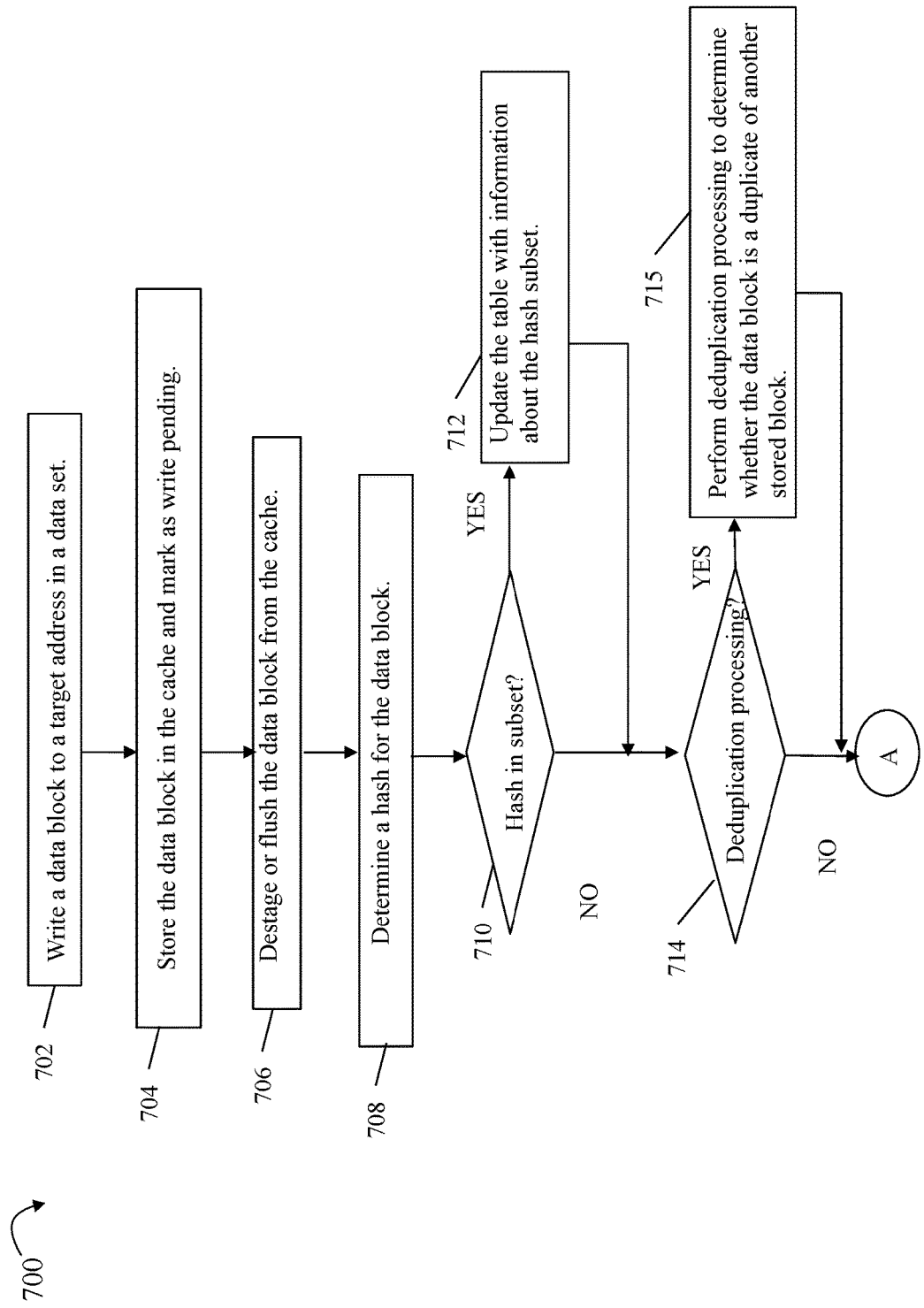
FIGS. 7A and 7B are flowcharts of processing steps that may be performed in an embodiment in accordance with the techniques herein.
Figure 7B:
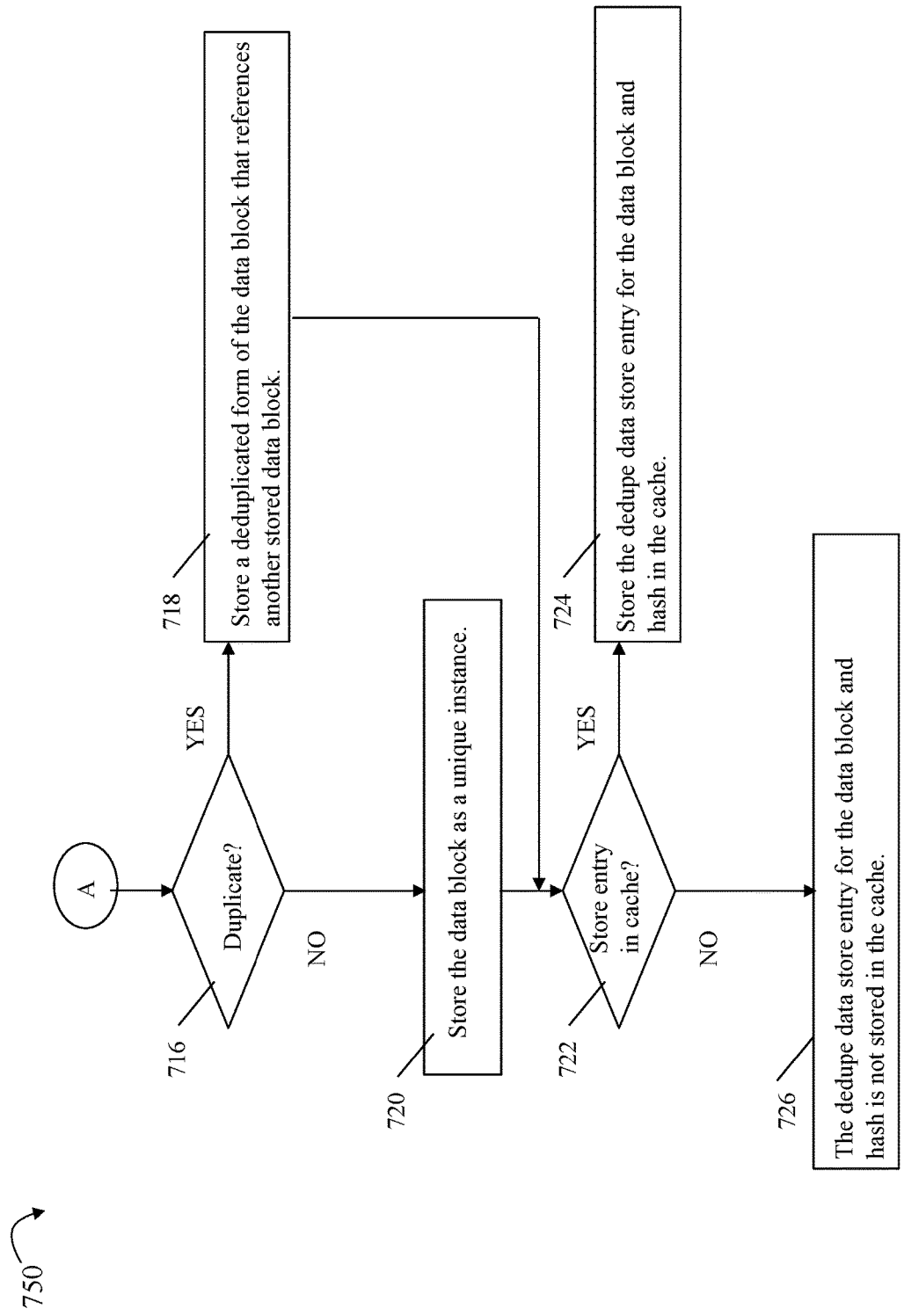

Referring to FIGS. 7A and 7B, shown processing steps that may be performed in an embodiment in accordance with the techniques herein. The flowcharts 700, 750 summarize processing described above.

At the step 702, a data block may be written to a target address of a data set. From the step 702, control proceeds to the step 704 where the data block is stored in the cache and marked as write pending. From the step 704, control proceeds to the step 706 where the data block is destaged or flushed from the cache. From the step 706, control proceeds to the step 708. At the step 708, a hash is determined for the data block. From the step 708, control proceeds to the step 710.

At the step 710, a determination is made as to whether the hash is in the specified subset of hash values. If the step 710 evaluates to yes, control proceeds to the step 712. At the step 712, the table of information about the subset of hash values is updated. The table is updated to include information regarding the data block having the hash value where the data block is stored at the target address of the data set. The updating may include, for example, updating information associated with an entry of the table including the hash value, where the information is updated to denote that the data set references the data block. The table may also be updated to indicate that the data block is stored at, or referenced by, the target logical address of the data set. From the step 712, control proceeds to the step 714. If the step 710 evaluates to no, control proceeds to step 714.

At the step 714, a determination is made as to whether to perform deduplication processing for the data block. As described above, the information in the table may be used as in the step 714 to determine whether to perform deduplication processing for the data block, where the deduplication processing determines if the data block is a duplicate of another stored data block or a target block. If the step 714 evaluates to yes, control proceeds to the step 715 to perform deduplication processing for the data block to determine whether the data block is a duplicate of another stored data block. From the step 715, control proceeds to the step 716. If the step 714 evaluates to no, control proceeds to the step 716.

At the step 716, a determination is made as to whether the data block is a duplicate of another data block or a target data block. Generally, the step 716 may evaluate to no if deduplication processing with respect to the data block is omitted. The step 716 may also evaluate to no if deduplication processing of the data block is performed but the deduplication processing determines that the data block is not a duplicate of another stored data block or target data block. The step 716 may evaluate to yes if deduplication processing of the data block is performed, where such deduplication processing determines that the data block is a duplicate of another stored data block or target data block. If the step 716 evaluates to yes, control proceeds to the step 718 to store the data block in a deduplicated form that references the other stored data block or target block. From the step 718, control proceeds to the step 722. If the step 716 evaluates to no, control proceeds to the step 720 to store the data block as a unique instance. From the step 720, control proceeds to the step 722.

At the step 722, processing determines whether to store a dedupe data store entry for the data block and the hash in the cache. As described above, the information in the table may be used such as in the step 722 to determine whether to store an entry of the deduplication data store in the cache, where the entry includes the hash and identifies the location of the data block. As also noted above, in an embodiment having multiple cache levels, the information in the table may be used to select in which of the cache levels to store the entry. If the step 722, evaluates to yes, control proceeds to the step 724 where the dedupe data store entry for the data block and the hash are stored in the cache. If the step 724 evaluates to no, control proceeds to the step 726 where the entry is not stored in the cache.

It should be generally noted that the terms digest, hash value, hash key, hash, and hash digest may be used interchangeably in various contexts herein to refer to an output generated by a hash function. In some contexts and in some embodiments, a hash value, hash or hash key may be directly output by a hash function for a particular input, and a truncated form of the hash function output may be used as the hash for the particular input in connection with the techniques herein.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
   receiving, using a processor, a first data block stored at a first logical address in a first data set, wherein a first hash value is derived from the first data block;
   determining, using a processor and in accordance with one or more selection criteria, whether the first hash value is included in a subset of hash values;
   responsive to determining the first hash value is included in the subset, performing first processing using a processor, wherein said first processing includes updating a table in accordance with the first hash value and the first data set, wherein the table includes information about hash values in the subset, and wherein the table includes a first entry for the first hash value and includes first information, wherein the first information identifies one or more data sets that reference the first data block and, for each of the one or more data sets of the first information, specifies a reference count denoting a number of times the first data block is referenced by said each data set;
   determining, using a processor and in accordance with the information in the table, to perform deduplication processing for the first data block to determine whether the first data block is a duplicate of another stored data block, wherein said determining to perform deduplication processing for the first data block further includes:
determining, using the first information of the table associated with the first entry for the first hash value, a first data deduplication percentage for the first data set including the first data block, wherein the first data deduplication percentage denotes a percentage of data blocks of the first data set which have corresponding hash values in the subset and which have been deduplicated; and
determining that the first data deduplication percentage is greater than a threshold;
responsive to determining the first data deduplication percentage is greater than the threshold, performing said deduplication processing for the first data block to determine whether the first data block is a duplicate of another stored data block included in a cached portion of a data deduplication store, wherein the cached portion of the data deduplication store is stored in a cache of a data storage system;
determining, using a processor and in accordance with said deduplication processing for the first data block, whether the first data block is a duplicate of the another stored data block included in the cached portion of the data deduplication store;
responsive to determining the first data block is a duplicate of the another stored data block included in the cached portion, storing, using a processor, the first data block as a deduplicated data block that references the another stored data block, and otherwise, storing the first data block as a new unique data block; and
responsive to determining the first data deduplication percentage is greater than the threshold, storing, using a processor, a corresponding entry for the first data block and the first hash value in the cache including the cached portion of the data deduplication store, and otherwise not storing the corresponding entry in the cache including the cached portion of the data deduplication data store.

2. The method of claim 1, further comprising:
determining, in accordance with the information in the table, whether to store the corresponding entry in one of a plurality of cached portions of the deduplication data store, wherein each of the plurality of cached portions is stored in a different one of a plurality of caching levels of the cache of the data storage system, wherein the cached portion is included in the plurality of cached portions, wherein the cached portion is stored in a first portion of the cache, and wherein the first portion of the cache corresponds to a first of the plurality of caching levels.

3. The method of claim 1, wherein each of the first data set and the one or more data sets is a logically defined storage entity.

4. The method of claim 3, wherein the logically defined storage entity includes any of: one or more logical devices, a portion of a logical device, a plurality of portions of a plurality of logical devices, one or more files, one or more file systems, and one or more directories.

5. The method of claim 1, wherein the first processing further updates the table in accordance with the first logical address at which the first data block is stored in the first data set.

6. The method of claim 5, wherein the table includes a second entry for a second hash value and includes second information, wherein the second hash value is derived from a second data block, and wherein the second information identifies one or more data sets that reference the second data block and, for each of the one or more data sets of the second information, specifies a reference count denoting a number of times the second data block is referenced by said each data set of the second information.

7. The method of claim 6, wherein the second data block is stored at a second logical address in a second data set and is also stored at a third logical address of a third data set, wherein the second information further includes the second logical address and denotes that the second logical address of the second data set references the second data block from which the second hash value is derived, and wherein the second information further includes the third logical address and denotes that third logical address of the third data set references the second data block from which the second hash value is derived.

8. The method of claim 7, wherein the first data block is stored at a fourth logical address of a fourth data set, wherein the first information further includes the fourth logical address and denotes that the fourth logical address of the fourth data set references the first data block from which the first hash value is derived.

9. The method of claim 8, further comprising:
determining a first distance between the first logical address and the fourth logical address of the first entry;
determining a second distance between the second logical address and the third logical address of the second entry;
determining whether the first distance equals the second distance; and
responsive to determining the first distance equals the second distance, performing deduplication processing to locate duplicate data blocks in the first data set and the second data set.

10. The method of claim 1, wherein the method is performed inline as part of an I/O or data path.

11. The method of claim 1, wherein the method is performed offline not as part of an I/O or data path.

12. A system comprising:
one or more processors; and
one or more memories comprising code stored thereon that, when executed, performs a method of processing data comprising:
receiving, using a processor, a first data block stored at a first logical address in a first data set, wherein a first hash value is derived from the first data block;
determining, using a processor and in accordance with one or more selection criteria, whether the first hash value is included in a subset of hash values;
responsive to determining the first hash value is included in the subset, performing first processing using a processor, wherein said first processing includes updating a table in accordance with the first hash value and the first data set, wherein the table includes information about hash values in the subset, and wherein the table includes a first entry for the first hash value and includes first information, wherein the first information identifies one or more data sets that reference the first data block and, for each of the one or more data sets of the first information, specifies a reference count denoting a number of times the first data block is referenced by said each data set;
determining, using a processor and in accordance with the information in the table, to perform deduplication processing for the first data block to determine whether the first data block is a duplicate of another stored data block, wherein said determining to perform deduplication processing for the first data block further includes:
  determining, using the first information of the table associated with the first entry for the first hash value, a first data deduplication percentage for the first data set including the first data block, wherein the first data deduplication percentage denotes a percentage of data blocks of the first data set which have corresponding hash values in the subset and which have been deduplicated; and
  determining that the first data deduplication percentage is greater than a threshold; and
responsive to determining the first data deduplication percentage is greater than the threshold, performing said deduplication processing for the first data block to determine whether the first data block is a duplicate of another stored data block included in a cached portion of a data deduplication store, wherein the cached portion of the data deduplication store is stored in a cache of a data storage system;
determining, using a processor and in accordance with said deduplication processing for the first data block, whether the first data block is a duplicate of the another stored data block included in the cached portion of the data deduplication store;
responsive to determining the first data block is a duplicate of the another stored data block included in the cached portion, storing, using a processor, the first data block as a deduplicated data block that references the another stored data block, and otherwise, storing the first data block as a new unique data block; and
responsive to determining the first data deduplication percentage is greater than the threshold, storing, using a processor, a corresponding entry for the first data block and the first hash value in the cache including the cached portion of the data deduplication store, and otherwise not storing the corresponding entry in the cache including the cached portion of the data deduplication data store.

13. A non-transitory computer readable medium comprising code stored thereon that, when executed, performs a method of processing data comprising:
  receiving, using a processor, a first data block stored at a first logical address in a first data set, wherein a first hash value is derived from the first data block;
  determining, using a processor and in accordance with one or more selection criteria, whether the first hash value is included in a subset of hash values;
  responsive to determining the first hash value is included in the subset, performing first processing using a processor, wherein said first processing includes updating a table in accordance with the first hash value and the first data set, wherein the table includes information about hash values in the subset, and wherein the table includes a first entry for the first hash value and includes first information, wherein the first information identifies one or more data sets that reference the first data block and, for each of the one or more data sets of the first information, specifies a reference count denoting a number of times the first data block is referenced by said each data set;
  determining, using a processor and in accordance with the information in the table, to perform deduplication processing for the first data block to determine whether the first data block is a duplicate of another stored data block, wherein said determining to perform deduplication processing for the first data block further includes:
    determining, using the first information of the table associated with the first entry for the first hash value, a first data deduplication percentage for the first data set including the first data block, wherein the first data deduplication percentage denotes a percentage of data blocks of the first data set which have corresponding hash values in the subset and which have been deduplicated; and
    determining that the first data deduplication percentage is greater than a threshold;
  responsive to determining the first data deduplication percentage is greater than the threshold, performing said deduplication processing for the first data block to determine whether the first data block is a duplicate of another stored data block included in a cached portion of a data deduplication store, wherein the cached portion of the data deduplication store is stored in a cache of a data storage system;
  determining, using a processor and in accordance with said deduplication processing for the first data block, whether the first data block is a duplicate of the another stored data block included in the cached portion of the data deduplication store;
  responsive to determining the first data block is a duplicate of the another stored data block included in the cached portion, storing, using a processor, the first data block as a deduplicated data block that references the another stored data block, and otherwise, storing the first data block as a new unique data block; and
  responsive to determining the first data deduplication percentage is greater than the threshold, storing, using a processor, a corresponding entry for the first data block and the first hash value in the cache including the cached portion of the data deduplication store, and otherwise not storing the corresponding entry in the cache including the cached portion of the data deduplication data store.

* * * * *